United States Patent [19]

Brauer et al.

[11] Patent Number: 4,596,743

[45] Date of Patent: * Jun. 24, 1986

[54] GREASE COMPATIBLE EXTENDED POLYURETHANES

[75] Inventors: Melvin Brauer, East Brunswick; William J. Downey, Linden; Frank C. Naughton, Mountainside; Jerry C. Chao, Bayonne, all of N.J.

[73] Assignee: CasChem, Inc., Bayonne, N.J.

[*] Notice: The portion of the term of this patent subsequent to Aug. 6, 2002 has been disclaimed.

[21] Appl. No.: 713,378

[22] Filed: Mar. 19, 1985

Related U.S. Application Data

[63] Continuation-in-part of Ser. No. 553,196, Nov. 18, 1983, Pat. No. 4,533,598.

[51] Int. Cl.$^4$ .................. C08K 5/01; C08K 5/10; C08L 75/04
[52] U.S. Cl. .................. 428/380; 174/25 C; 174/50.5; 174/52 PE; 174/68 A; 156/48; 156/49; 264/272.13; 427/58; 427/117; 428/379; 428/383; 523/173
[58] Field of Search .............. 523/173; 524/871, 875, 524/848, 775, 773, 873, 768; 428/379, 380

[56] References Cited

U.S. PATENT DOCUMENTS

| | | | |
|---|---|---|---|
| 3,047,520 | 7/1962 | Fiel | 260/18 |
| 3,136,732 | 6/1964 | Kaestner et al. | 260/33.6 |
| 3,338,861 | 8/1967 | Mastin et al. | 260/33.6 |
| 3,390,119 | 6/1968 | Alexander et al. | 524/871 |
| 3,748,294 | 7/1973 | Kershow et al. | 260/22 |
| 3,801,532 | 4/1974 | Olstowski | 260/33.8 |
| 3,869,421 | 3/1975 | Sapp et al. | 260/33.6 AQ |
| 3,883,465 | 5/1975 | Olstowski | 260/31.2 |
| 3,886,102 | 5/1975 | Olstowski | 260/18 TN |
| 3,886,111 | 5/1975 | Yoshimura et al. | 260/31.2 N |
| 3,933,725 | 1/1976 | Dearlove et al. | 524/848 |
| 3,963,656 | 6/1976 | Meisert et al. | 260/18 TN |
| 3,980,606 | 9/1976 | Werner | 260/31.8 R |
| 4,067,834 | 1/1978 | Olstowski | 260/18 TN |
| 4,076,660 | 2/1978 | Olstowski | 260/9 |
| 4,102,716 | 7/1978 | Groves et al. | 524/871 |
| 4,122,058 | 10/1978 | Olstowski | 524/871 |
| 4,168,363 | 9/1979 | Boetchler | 528/48 |
| 4,171,998 | 10/1979 | Brauer et al. | 156/48 |
| 4,176,239 | 11/1979 | Brauer et al. | 174/23 C |
| 4,231,986 | 11/1980 | Brauer et al. | 264/272 |
| 4,264,486 | 4/1981 | McLaughlin | 260/33.6 UB |
| 4,281,210 | 7/1981 | Brauer et al. | 174/23 C |
| 4,329,442 | 5/1982 | Pokorney | 528/49 |
| 4,373,057 | 2/1983 | Hammond | 524/700 |
| 4,375,521 | 5/1983 | Arnold | 523/173 |
| 4,396,053 | 8/1983 | Davis et al. | 524/871 |
| 4,533,598 | 8/1985 | Downey | 523/173 |

*Primary Examiner*—C. Warren Ivy
*Attorney, Agent, or Firm*—Pennie & Edmonds

[57] ABSTRACT

A grease compatible cyclic olefin extended polyurethane comprising the reaction product of an isocyanate terminated polyisocyanate with a polyol in the presence of a cyclic olefin extender and, a plasticizer having a total solubility parameter of between about 8.3 and 8.9 or about 9.1 and 9.7. Certain extended polyurethanes are characterized as being reenterable, such that they can be used for repairing, encapsulation or reclaiming electrical or telephone cables. Alternate formulations can be used as hard volume encapsulants for general elastomer use.

25 Claims, No Drawings

GREASE COMPATIBLE EXTENDED POLYURETHANES

CROSS REFERENCE TO RELATED APPLICATIONS

This application is a continuation-in-part of Ser. No. 553,196 filed Nov. 18, 1983 now U.S. Pat. No. 4,533,598, issued Aug. 6, 1985.

TECHNICAL FIELD

The invention relates to polyurethanes which contain novel plasticizers and which are extended with cyclic olefins. These compositions are formulated as grease compatible, non-spewing materials for use in reclaiming, encapsulating, or sealing telecommunication or electrical devices such as cable, as well as for other uses.

BACKGROUND ART

It is well-known in the art to extend polymers such as polyurethanes. This extended material will then be designated for use in a desired area of utility. Typical of such extending agents is mineral oil, such mineral oil extended polyurethanes being disclosed in U.S. Pat. Nos. 3,714,110 and 3,747,037.

It has also been determined that the mineral oil extended polyurethane is useful in the reclamation and protection of insulated electrical devices. Such devices may, for example, be underground telephone cables which are exposed to fluid contaminants. These contaminants can seriously impair the electrical and mechanical properties of such a device. The protectant material is pumped into the cable to remove water that has penetrated into interior free spaces. The material is pumped at low viscosity to achieve an appropriate distribution and it then cures in place to a high viscosity. The cured material acts as a hydrophobic barrier to subsequent water penetration. In another application, this material may be utilized as an encapsulant for sealing sections of cable. In this manner, the material serves to prevent, from the outset, the penetration of fluid contaminants.

A mineral oil extended polyurethane which is useful for this purpose is disclosed in U.S. Reissue Pat. No. RE 30,321. That patent defines a cured, cross-linked, mineral oil extended polyurethane prepared from specific polyurethanes and coupling agents, the latter being necessary to compatibilize the mineral oil with the cross-linking urethane elastomer.

Disadvantages of these mineral oil extended polyurethane systems were encountered, however, and these are described in U.S. Pat. No. 4,168,258. There it was stated that, with the earlier mineral oil extended polyurethanes, the mineral oil would tend to migrate toward any grease present in the cable or device in order to be reclaimed or encapsulated. This grease is encountered more frequently in newer insulated electrical devices. This migration was shown to cause the formation of an oily film at the grease interface which tended to decrease the reclamation and encapsulant effectiveness of the polyurethane. In order to avoid these difficulties, the patent specifically defined a polyurethane-mineral oil-coupling agent formulation relying on the presence of a polydiene moiety in the polyurethane structure. Mineral oil remained as the extending agent, with the stated preference for including some aromatic carbon content therein.

It is also known that previous polyurethane compositions have been difficult to re-enter after they have fully cured primarily due to their high cast strength and aging hardness, as well as due to their opaque or cloudy color. The high cast strength and hardness of these prior art polyurethanes contribute to the difficulty of cutting through or removing cured material from a repaired area. In some applications, the opaque color makes it difficult for the operator to establish the exact location to reenter a repair. For these reasons, clear, soft polyurethane gels are preferred. With either the clear or opaque products, the ability of these polyurethanes to be easily reentered is important in the repair or encapsulation of insulated electrical or telephone cables when a second splice or connection must be made in the same area as the previous repair or encapsulation. There are also situations where the initial repair or encapsulation is improperly made and has to be re-done. For these reasons, the primary concern regarding the physical properties of these gels is to provide a polyurethane having a relatively low tear strength and hardness. Furthermore, it is highly desirable for these materials to maintain these properties over time.

A vegetable oil extended polyurethane which satisfies some of these requirements and provides an initially reenterable gel is disclosed in U.S. Pat. No. 4,375,521. There, vegetable oil extended polyurethanes of a three component system comprising a specific polyurethane, vegetable oil, and specific extending agent is disclosed for use in reclamation and encapsulation applications. However, these vegetable oil extended formulations usually provide opaque gels, and, more importantly, tend to cause cracking or stressing of the polycarbonate connectors which are usually present in the cable unit being reclaimed, encapsulated, or repaired. Furthermore, some of these gel formulations age harden over time to make reenterability difficult.

In U.S. Pat. No. 4,355,130, a polyalphaolefin extended polyurethane is disclosed which resolves the stress cracking problem. Such polyalphaolefin extended polyurethanes comprise specific polyurethanes, a specific polyalphaolefin extender, and, for reclamation and encapsulation purposes, specific ester coupling agents. The coupling agent is required to compatibilize the formulation so that there will be no "spewing" of extender from the cured material.

Generally, the use of high amounts of such coupling agents tends to reduce the electrical characteristics of the gels. This is due to the presence of ester or other polar groups within the polyurethane structure. When such polyurethanes are used for the repair or encapsulation of electrical devices, they are unable to restore the same electrical characteristics because of their higher dissipation factors. Also, such formulations are not compatible with cable grease and the polyalphaolefin would tend to migrate toward any such grease present in the cable or device to be repaired or encapsulated.

U.S. Pat. No. 4,533,598 issued Aug. 6, 1985 discloses extended polyurethanes which provide soft, reenterable gels having excellent electrical characteristics. These gels comprise a polyurethane which is extended with a liquid cyclic olefin. However, these compositions have limited compatibility with cable grease.

Thus, while the art described in the above patents represents a progression in the technology of reenterable encapsulants, none satisfactorily solves the problem of compatibility with cable grease. When the state of the art encapsulants are in contact with cable greases, an incompatibility develops as evidenced by an exudation of a liquid either from the grease or the encapsulant. In some cases, the liquid interface may result from migration of liquids from both the encapsulant and the grease. It has been demonstrated that the presence of a liquid interface between the cable grease and the encapsulant will provide a leak path for water or contaminants. The presence of such contaminants then leads to the failure of the electrical devices by corrosion.

DISCLOSURE OF THE INVENTION

It is, therefore, an object of the present invention to provide an extended polyurethane gel system having improved compatibility with cable greases for various uses including the reclamation or encapsulation of telecommunication or fiber optic cable.

It is another object to provide novel combinations of plasticizing and extending agents for such polyurethane gel systems which likewise improves upon physical properties of the polyurethanes of the prior art.

It is a further object to provide extended polyurethane formulations which are defined in accordance with specific end use applications.

It has now been found that by utilizing cyclic olefins as the first extending agent for polyurethanes along with a specified plasticizer compound, the resulting systems are compatible with cable greases and thus are well suited for a number of end use applications including telecommunication cable reclamation and encapsulation or as general polyurethane elastomers. Such cyclic olefin extended polyurethanes comprise a specified polyurethane, a cyclic olefin, and, a specified plasticizer compound. If desired, a second extender can also be used.

The cyclic olefins of the present invention are characterized by excellent compatibility with the polyurethane, a broad viscosity range, good electrical properties, and the absence of cracking or stressing tendencies on polycarbonate connectors. It is particularly in the area of compatibility with polyurethane and electrical properties that these polyurethanes exhibit significant improvements over prior art extender and ester coupling agent systems.

When used in the area of reclamation and encapsulation, the polyurethanes of the present invention provide excellent performance characteristics. They possess the low viscosities necessary for initial introduction into the cable and the ability to retain these low viscosities for a period of time sufficient to enable them to fill the length of the free spaces in the cable or form a completely encapsulating cover. They also possess the ability to displace and/or repel fluid contaminants and cure in place to form a gel-like urethane structure which neither spews forth nor exudes the plasticizer. This gel structure has sufficient rigidity to provide an excellent protective barrier, yet can be readily cut and removed if re-entry is desired. The polyurethane is non-corrosive to copper wire and compatible with the conventionally used polycarbonate connectors and other polymeric materials utilized in cable manufacture. The system is also convenient to handle and apply in the field.

The polyurethane which is used in these formulations is generally prepared by reacting approximately stoichiometric amounts of an organic polyisocyanate with a polyol. In a preferred embodiment, the organic polyisocyanate is a polyisocyanate prepolymer which is in turn prepared by reacting an excess of an polyisocyanate compound with a polyol in a manner well known in the art. The polyisocyanate prepolymer is then reacted with the polyol in the presence of the cyclic olefin and the specified plasticizer compound and, optionally, any second extenders to form the cyclic olefin extended polyurethane. In a second embodiment, the organic polyisocyanate is a polyisocyanate compound which directly reacts with the polyol in the presence of the cyclic olefin and the specified plasticizer compound and, optionally, any second extenders to form the cyclic olefin extended polyurethane.

The organic polyisocyanate compounds which can be used for the preparation of the polyisocyanate prepolymer or reaction with the polyol to form the polyurethane contemplate any organic polyisocyanate having 2 or more NCO groups per molecule and no other substitutents capable of reacting with the hydroxy groups of the polyol. This would include aliphatic polyisocyanates, cycloaliphatic polyisocyanates, or aromatic polyisocyanates. Typical of such polyisocyanate compounds are 3-isocyanatomethyl-3,5,5-trimethylcyclohexyl isocyanate (IPDI), toluene diisocyanate (TDI), 4, 4' diphenylmethanediisocyanate (MDI), polymethylene polyphenylisocyanate, 1, 5 naphthalene diisocyanate, phenylene diisocyanates, 4, 4' -methylene bis-(cyclohexylisocyanate), hexamethylene diisocyanate, biuret of hexamethylene diisocyanate, 2, 2, 4-trimethylhexamethylene diisocyanate and combinations thereof, as well as related aromatic, aliphatic, and cycloaliphatic polyisocyanates which may be substituted with other organic or inorganic groups that do not adversely affect the course of the reaction.

The term "aliphatic", as used herein, includes those carbon chains which are substantially non-aromatic in nature. They may be saturated or unsaturated, unbranched, branched, or cyclic in configuration and may contain substituents which do not adversely affect migration. Such aliphatic isocyanates generally have an equivalent weight of from 60 to 160 and a viscosity of 1 to 1500 centipoises at 25° C. Exemplary of the liquid long chain aliphatic polyisocyanates are dodecyl diisocyanate, tridecyl diisocyanate, and the like. Polymethylene polyphenyl isocyanate is commercially available from Mobay Chemicals under the trademark Mondur MRS. Two preferred compounds, Mondur MRS and MRS-10, are dark-brown liquids having a slight aromatic ordor. Specifically Mondur MRS has an NCO content of 31.5%, an amine equivalent of 133, a viscosity of 200 mPa-S at 25° C., and a density of 1.24 g/cc, while Mondur MRS-10 has an NCO content of 31.9%, an amine equivalent of 132, a viscosity of 80 mPa-s at 25° C. and a density of approximately 1.24 g/cc. Diphenyl methane diisocyanates are commercially available in a stabilized liquid form from Upjohn under the trademark Isonate 143L or from Mobay under the trademark Mondur CD. Specifically, Isonate 143-L is a light yellow, modified diphenyl-methane diisocyanate having an NCO content of 29.2 weight percent, an isocyanate equivalency of 144, an acidity value of less than 0.030 and a viscosity of 35 cps at 25° C., while Mondur CD is a light-yellow modified 4,4' diphenylmethane diisocyanate having an NCO content of 29.3 weight percent and a viscosity of less than 100 mPa-s at 25° C. Various polyarylene polyisocyanates are commercially available from Upjohn under the trademark PAPI, of which PAPI 94 is typical. PAPI 94 is a polymeric methylene diisocyanate containing approximately 98% of 4,4' isomer with the remaining 2% being the 2,4' isomer. PAPI 94 has an NCO content of approximately 2.

Suitable polyols for reaction with the previously described organic polyisocyanates include those known to be useful for the preparation of polyurethane gels having about 2–8 hydroxyl groups. Those polyols having about 2–4 hydroxyl groups are preferred. Typical examples include castor oil, polyether polyols, polyester polyols, hydroxyl bearing homopolymers of dienes, hydroxyl bearing copolymers of dienes, and combinations thereof. Such polyols generally have an equivalent weight of from 30 to 6000 and a viscosity of from 1 to 20,000 centipoises at 25° to 60° C. The higher equivalent weight materials, i.e., those having equivalent weights above about 250, are generally preferred.

One polyol which may be used in the preparation of these cyclic olefin extended polyurethane is castor oil, a compound primarily composed of ricinolein, which is a glyceride of ricinoleic acid. A typical castor oil comprises a mixture of about 70% pure glyceryl triricinoleate and about 30% glyceryl diricinoleate-monoleate or monolinoleate and is available from CasChem, Inc. as DB Oil.

Suitable polyether polyols include aliphatic alkylene glycol polymers having an alkylene unit composed of at least two carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed. A typical polyether polyol is available from Union Carbide under the designation Niax PPG-425. Specifically, Niax PPG-425, a copolymer of a conventional polyol and a vinyl monomer, has an average hydroxyl number of 263, an acid number of 0.5, and a viscosity of 80 centistokes at 25 C.

The general term polyether polyols also includes polymers which are often referred to as amine based polyols or polymeric polyols. Typical amine based polyols include sucrose-amine polyols such as Niax BDE-400 or FAF-529 or amine polyols such as Niax LA-475 or LA-700, all of which are available from Union Carbide. As one skilled in the art would know, there are no free amino hydrogens in any of these compounds.

The hydroxyl bearing homopolymers of dienes or hydroxyl bearing copolymers of dienes are prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl groups having about 1 to about 4 carbon atoms, substituted aryl, unsubstituted aryl, halogen, and the like. Typical of such dienes are 1,3-butadiene, isoprene, chloroprene, 2-cyano-1,3-butadiene, 2,3-dimethyl -1,2-butadiene, and the like. The preferred dienes are 1,3-butadiene and isoprene. A hydroxyl terminated polybutadiene is available from ARCO Chemicals under the designation Poly-BD R-45HT. Specifically, Poly-BD R-45HT has a molecular weight of about 2800, a degree of polymerization of 50, a hydroxyl functionality of about 2.4 to 2.6, a hydroxyl number of 46.6, a hydroxyl value of 0.83, and an iodine number of 398.

A wide variety of aromatic and aliphatic diamines may form part of the amine-based polyols, such as N, N-bis (2-hydroxypropyl) aniline and N,N,N′,N′ -tetrakis (2-hydroxypropyl) ethylenediamine. A typical amine-based polyol is available from Upjohn under the designation Isonol 100, an amber colored liquid polyol having a molecular weight of 209, a hydroxyl number of 534, an equivalent weight of 104.5, an average funtionality of 2.0 and a viscosity of 1450 at 50° C. A typical aliphatic amine-based polyol is available from BASF under the designation Quadrol, a viscous liquid polyol with four hydroxyl groups, two tertiary nitrogen atoms, a hydroxyl number of 770 and a viscosity of 53,000 cps at 25° C.

The general term polyether polyols also includes compounds which are referred to as polymeric polyols. Polymeric polyols can be described as conventional polyols with a stable dispersion of vinyl polymers. For example, U.S. Pat. No. 4,104,236 discloses such polyols with acrylonitrile-styrene polymers; a further typical polyol is available from Union Carbide under the designation Niax 24-32. Specifically, Niax 24-32, a copolymer of a conventional polyol and a vinyl monomer, has an average hydroxyl number of 32 and a viscosity of 1300 centipoise at 25° C.

The term polymeric polyols also includes other combination polyols, such as graft polyols or other synthetic polyol combinations.

The cyclic olefins utilized herein as the first extenders typically include dipentene, pinene, dicyclopentadiene, and polycyclopentadiene, all of which are commercially available. The cyclic olefins consist of at least one 5 or 6 membered ring with at least one unsaturated bond. In addition to this one unsaturated ring, the compound may include saturated carbon chains, unsaturated carbon chains, saturated carbon rings, unsaturated carbon rings, or combinations of any of these carbon structures. These cyclic olefins can range from very low viscosities, in the case of low molecular weights, to high viscosities, in the case of high polymerization of these compounds. These compounds are compatible with polyurethanes without the use of additional compatibilizers, such as ester coupling agents. They can also be polymerized with other non-cyclic, unsaturated compounds to produce a material which is compatible with polyurethanes.

The polyurethanes of the present invention may also optionally contain a benzenoid compound along with the cyclic olefin extender. Typical benzenoid compounds include toluene and pyrrole, and these are also compatible with polyurethanes without the use of ester coupling agents. Both the cyclic olefin and cyclic olefin/benzenoid compound extended polyurethanes will not exhibit spewing of the extender and are utilized in concentration ranging from about 1–92 weight percent of the total extended polyurethane system.

The plasticizer compounds which can be used in this invention include any compounds or mixture of compounds having a total solubility parameter of between about 8.3 and 8.9 or between about 9.1 and 9.7. Compounds having solubility parameters higher than 9.7 are too volatile for use in gel formulations, while those having solubility parameters less than 8.3 are not compatible with the polyurethane reaction product.

Suitable plasticizer components are esters such as the phthalates or adipates having between about 4 and 13 carbon atoms, since these compounds possess solubility parameters falling within the above-described critical ranges. Certain ricinoleate compounds such as glyceryl tri (acetyl ricinoleate) and similar compounds which have solubility parameters within the above-disclosed ranges, are also useful and, would be preferred due to their greater compatibility under a wide range of cable fillers or greases which are typically encountered in the reclamation or encapsulation of telecommunication or electrical cable.

Vegetable oils having total solubility parameters falling within the above-identified range are also useful in this invention without the need for a compatibilizer or coupling agent. Specific preferred compounds for can be used as plasticizers in accordance with the invention are listed below in Table I.

TABLE I

| PLASTICIZER COMPOUNDS | |
|---|---|
| Compound | Solubility Parameter |
| soybean oil | 8.3 |
| ditridecyl adipate | 8.9 |
| diundecyl phthalate | 9.12 |
| diisodecyl phthalate | 9.15 |
| glyceryl tri (acetyl ricinoleate) | 9.3 |
| dibutyl phthalate | 9.7 |

The specific solubility parameter ranges have been determined by weight gain and conductor pull out tests as shown by the examples. Specifically, compounds having a total solubility parameter which results in a weight loss or in which a conductor cable can be easily pulled out are not satisfactory for use in this invention.

Also, one or more of the above-identified plasticizers can be used in combination without departing from the teachings of the invention provided that the overall solubility parameter remains in the critical range.

The solubility parameters of the plasticizer compounds are determined as described in the article entitled "A Method for Estimating Both the Solubility Parameters and Molar Volumes of liquids," by R. F. Fedors, POLYMER ENGINEERING SCIENCE, Vol. 14, No. 2, February, 1974, pp. 147–154. This article is expressly incorporated by reference in this application.

As noted in the above-mentioned article, the total solubility parameter for a liquid at 25° C. can be calculated from equation 28 as follows:

$$\gamma = \sqrt{\frac{\sum_i \Delta e_i}{\sum_i \Delta v_i}}$$

wherein $e_i$ and $v_i$ are the additive atomic and group contribution for the energy of vaporization and molar volume, respectively. Based upon a vast amount of data on simple liquids, these contributions applicable at a temperature of 25° C. have been compiled in Table 5 of the article. Thus, in order to calculate the total solubility parameter for any liquid organic compound, all one need to know is the chemical structure of the compound. Therefore, the term "total solubility parameter" as used in this application is intended to mean the solubility parameter of the compound at 25° C. which is calculated from the experimental energy of vaporization and molar volume values given in Table 5 of the Fedors article. The values which appear in Table I of this application are the total solubility parameter for those compounds calculated in the manner previously described.

With respect to the weight change testing, there are different types of greases which may be encountered in telecommunication cable. The most common is FLEX-GEL cable filler. FLEXGEL is a registered trademark of the Western Electric Co. Inc. for their cable filling compounds for waterproofing electrical cable. Other cables may have petroleum jelly (PJ) or polyethylene modified petroleum jelly (PEPJ). PEPJ is a higher melting point material than PJ. It should be noted that the ricinoleates have a wider range of compatibility with all types of cable fillers than the other plasticizer compounds.

With respect to the use of these plasticizer compounds in the formulations of the present invention, it should be noted that those compounds having a solubility parameter between about 9.1 and 9.7 provide clear and transparent gels which are preferred for applications where reenterability is of primary importance. Those compounds having solubility parameters between about 8.3 and 8.9 do impart a degree of opaqueness to the resulting gel with the lower values generally providing a higher degree of cloudiness or opaqueness in the gel. However, all the polyurethane gels according to this invention are soft with a low tear strength, and these properties are maintained over time to provide desirable reenterable compounds.

It should further be noted that all the suitable plasticizer components according to the invention are low viscosity liquids at room temperature.

As stated hereinabove, a coupling agent or compatibilizer such as an ester compouhd is not required for the extended polyurethane, but such coupling agents may optionally be used in these extended polyurethanes in specific applications. In the case of highly polymerized cyclic olefins, a coupling agent can be used to lower the viscosity, if desired. When used, the coupling agent may range up to about 50 weight percent of the total extended polyurethane. Such compounds are non-reactive or substantially non-reactive with the polyurethane forming components. Esters are preferred, and they may be saturated or unsaturated and may be aliphatic, cycloaliphatic, or aromatic aliphatic. Typical esters include phthalates such as 2-ethylhexyl phthalate, and mixtures of n-$C_9$, $C_{10}$, and $C_{11}$ phthalates, adipates such as diisodecyl adipate and n-octyl-n-decyl adipate, glutarates, fumarates, sebacates, citrates, and the like, as well as polymeric esters such as Plastolein 9720 from Emery Industries, a plasticizer having an acid value of 3.0, as hydroxyl value of 20, and a viscosity of 207 centistokes at 100 F to provide a low volatility material having good resistance to oil extraction.

The cyclic olefin extended polyurethane can also optionally include other extender compounds which can be used with or without a compatibilizer. Most oils commercially available for rubber processing may be used for oil extension of the extended polyurethanes of this invention. When used, these extenders can range up to 50 weight percent of the total extended polyurethane. Examples of compounds included in the term processing oils are listed in U.S. Pat. No. 3,107,224, and they can be classified by source into the following groups: petroleum oils and asphalts, petroleum waxes, coal tar oils and pitches, esters, chlorinated hydrocarbons, pine tars and oils, phenols, and resins. All of these commercially available materials are essentially hydrocarbon, that is, at least about 50 weight percent carbon and hydrogen. Preferably, the oil is at least about 75 weight percent or more preferably at least about 90 weight percent carbon and hydrogen. As is apparent from the materials listed, the hydrocarbon chains or rings may be interrupted or terminated by non-hydrocarbon groups, for instance, ester, ether, or other oxygen-containing linkages.

Usable processing oils are characterized by a viscosity SSU at 100 F of at least 30, and preferably at least about 70. Petroleum oils are most often used in extending natural and synthetic rubbers as well as the polyurethanes of this invention, and generally are categorized as paraffinic, napthenic (cycloaliphatic), aromatic, or asphaltic oils. However, processing oils which combine the characteristics of two or more of these types also may be employed. Viscosities frequently vary from about 100–600 SSU at 100° F. or 35–100 SSU at 210° F. although aromatic and/or asphaltic oils of up to 1000 or 2000 or more SSU at 100° F. are sometimes used.

Coal tar pitch, asphalts, asphaltenes, chlorinated biphenyl ethers, chlorinated waxes, chlorinated oils, rosin esters, certain esters and amides of styrene-maleic anhydride resins, courmarone-indene resins, polybutenes, as well as many other processing compounds may be used, either alone or in conjunction with oils as a further extender. Aromatic and chlorinated oils may also be used as extenders.

Additional extenders composed mainly of hydrocarbons are usually preferred because of their improved hydrolytic properites, oxidative properties, and lower cost. Other extenders include the low molecular weight polybutenes or polyisobutylenes as well as the high boiling fractions of petroleum polymers ordinarily used for lubricants. Chlorinated aromatic and aliphatic hydrocarbons, aromatic ethers, and phosphorus derivatives are particularly advantageous since they may impart some flame retardance to the finished product. The additional extender may comprise up to about 40 weight percent of the cyclic olefin extended polyurethane.

In accordance with the extended polyurethanes of the present invention, finely divided solid fillers which are commonly employed in the art as either reinforcing or inert fillers can also be utilized. The use of such solid fillers applies mainly to non-reenterable polyurethanes. Conventional fillers include carbon black, asphaltenes, silica, silica-alumina, hydrated silica, zinc oxide, magnesium carbonates, clays, talc, and pulverized reclaimed rubber as well as various mineral fillers which are known in the art. Solid fillers may be employed in the amount of up to 50 weight percent the polyurethane.

The cyclic olefin extended polyurethane of the present invention is generally comprised of from about 10 to 90 parts by weight of an extended polyurethane comprising about 8 to 99 parts by weight of a polyurethane, and about 92 to 1 part by weight of a cyclic olefin, and about 90 to 10 parts by weight of a plasticizer compound. Optionally, up to about 50 parts by weight of a coupling agent, up to about 40 parts by weight of an second extender, and up to 50 parts by weight of a solid filler can be added. The preferred concentration with particular reference to the reclaiming or encapsulating utility comprises about 10 to 50 parts by weight of extended polyurethane as described above, and about 90 to 50 parts by weight of plasticizer. If amounts less than 10% polyurethane are used, the resulting gel will have essentially no tear strength at all, while if less than 10% of plasticizer is used, the resulting formulation will not provide the improved properties. The preferred concentration with particular reference to the reclaiming or encapsulating utility comprises about 30 to 40 parts by weight of polyurethane reaction product, about 70 to 60 parts by weight of plasticizer.

If hard, grease compatible formulations are desired, the relative proportions would be about 90 to 50 parts by weight of polyurethane and about 10 to 50 parts by weight of plasticizer.

The instant cyclic olefin extended materials are preferably prepared at the application site by admixing the resin system with the hardener system. Depending on the desired utility, the resin and hardener are utilized in the required amounts meeting the stoichiometric requirements. In a preferred embodiment, the resin component comprises the organic polyisocyanate, all or a portion of the cyclic olefin, at least a portion or all of the plasticizer and, if present, the benzenoid and coupling agent or other extenders. The hardener component comprises the polyol, and, when present, the remaining portion of the plasticizer a second portion of the same or different coupling agent, any other extender or benzenoid compounds, and the remaining portion of the cyclic olefin. The catalyst and optional additives such as fungicides, pigments, anti-oxidants, moisture scavengers, and the like, are generally added to the hardener component. Catalysts are known to those skilled in the art and may comprise, for example, heavy metals utilized in amounts of about 0.1 weight percent of the hardener component.

It is also possible to mix all the desired components together in a single batch to prepare the polyurethane and then apply the mixture and allow it to cure to the final product.

As noted, the cyclic olefin extended polyurethanes possess the desired properties for a range of utilities, with primary emphasis on utilities such as grease compatible reenterable encapsulants and reclamants for insulated electrical devices. Initially, these materials are sufficiently fluid to be introduced into the core of a cable or mold surrounding the area of concern and to retain their fluidity for a period of time sufficient to fill all the interior free spaces.

The term "reclamation" is used to include the situation wherein the polyurethane gel compositions of the invention are injected into damaged telecommunication or electrical cable to displace any fluid contaminants and restore the cable to its initial condition. As the gel cures, it expands and displaces the contaminants in the damaged cable.

The term "encapsulation" refers to the use of the polyurethane gels of the invention to seal a splice or connection to a cable. In this arrangement, the electrical connections are made to an existing cable, a closure of polyethylene or similar material is made around the connection, and the gel composition is injected into the space between the closure and cable, where it expands and cures to form a moisture resistant seal.

In its reclaiming function, the polyurethane will thus displace the liquid penetrants in the free spaces. Thereafter, a stable gel forms within a reasonable period of time to provide a seal against penetration of water or other fluid materials. Where reenterability is desired, the selected polyurethane can be formulated to provide a gel which is sufficiently soft so as to be readily removed. The presence of a cyclic olefin produces a compatible extended polyurethane system without the use of coupling agents, the plasticizer imparting grease compatibility to these compositions.

When lower relative amounts of plasticizers and esters are used, the insulating properties of the reenterable encapsulant and reclamant are good, particularly with regard to the dissipation factor and volume resistivity of the material. Furthermore, there is no exudation of extenders used and there is excellent compatibility with materials employed in the cable construction and with polycarbonante connectors. In addition, the instant extended polyurethanes can be utilized as hard volume (permanent) encapsulants and for general polyurethane elastomeric uses.

EXAMPLES

The scope of the invention is further described in connection with the following examples which are set forth for the sole purpose of illustrating the preferred embodiments of the invention and which are not to be construed as limiting the scope of the invention in any manner.

EXAMPLE 1

The following examples illustrate the preparation of typical plasticizer/polyurethane gel systems of this invention which are intended for use as reenterable reclamants or encapsulants. All components appear in parts by weight unless otherwise indicated.

TABLE I

| Component | Typical Polyurethane Formulations | | | | | |
|---|---|---|---|---|---|---|
| | A | B | C | D | E | F |
| polymethylene polyphenyl isocyanate (1) | 4.8 | 4.8 | 4.8 | 4.8 | 9.5 | 4.8 |
| castor oil (2) | 4.7 | 4.7 | 4.7 | 4.7 | 9.3 | 4.7 |
| polycyclopentadiene (3) | 6.5 | 32.5 | 16.3 | 48.7 | 7.5 | 1.0 |
| hydroxyl terminated polybutadiene (4) | 25.5 | 25.5 | 25.5 | 25.5 | 51.2 | 25.5 |
| diundecyl phthalate | — | 32.5 | — | — | — | — |
| ditridecyl adipate | — | — | — | 16.3 | — | — |
| glyceryl tri (acetyl ricinoleate) | — | — | 48.7 | — | 22.5 | 64.0 |

(1) PAPI 94 from Upjohn
(2) DB Oil from CasChem, Inc.
(3) Escopol R-020 from Exxon
(4) Poly-BD R45-HT from Arco Chemicals Polyurethanes were then prepared by mixing the components of each of the above-identified formulations. After curing, each of these polyurethanes were found to be soft, clear gels which are suitable for use in applications such as the encapsulation of electrical or telecommunication cable.

Each of these formulations was found to have suitable electrical properties for the intended application. Specifically, dissipation constants ranged from 2.9 to 3.8 and volume resistivities ranged from $4 \times 10^{12}$ to $2 \times 10^{14}$. All these values are acceptable for encapsulaton or reclamation compounds.

To determine the suitablity of these formulations for grease compatibility, the formulations were then cured on FLEXGEL cable filler, and, after curing, the weight change of the formulation was measured. Compatible formulations are those which show a weight gain, since this indicates that grease is taken into the formulation. Incompatible formulations show a weight loss which indicates exudation or separation of the extender or plasticizer from the gel. The tests were repeated for compatiblity with PEPJ and PJ cable fillers.

TABLE II

| Formulation | Test Results % Weight Change | | |
|---|---|---|---|
| | FLEXGEL | PEPJ | PJ |
| A | −6.5 | −11.2 | −9.7 |
| B | −4.4 | −8.2 | −10.8 |

TABLE II-continued

| Formulation | Test Results % Weight Change | | |
|---|---|---|---|
| | FLEXGEL | PEPJ | PJ |
| C | +2.3 | −2.1 | −3.2 |
| D | −6.3 | −9.1 | −8.1 |
| E | +4.8 | +0.4 | +0.7 |
| F | +6.0 | +1.2 | +2.2 |

Although positive values are preferred for weight change (since this indicates that grease is taken into the formulation), the formulations having low negative (i.e.—closer to zero) values are also suitable for many applications.

The results show that the novel plasticizing compounds of the invention when added to cyclic olefin extended polyurethane formulations, improve their grease compatibility by increasing the weight change either to less negative (i.e.—closer to zero) or positive values. Also, compounds that do not possess the disclosed total solubility range show a lower compatibility with such greases. Thus, polyurethane gels possessing good electrical properties and improved grease resistance are obtained by this invention.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new and desire to secure by Letters Patent is:

1. A grease compatible cyclic olefin extended polyurethane composition comprising from about 10 to 90 parts of the liquid reaction product of an organic polyisocyanate with a polyol in the presence of a liquid cyclic olefin, the polyisocyanate polyol reaction product being present in a range from about 8 to 99 parts by weight, and said cyclic olefin being present in range of from about 92 to 1 part by weight, and from about 90 to 10 parts by weight of a plasticizer having a total solubility parameter of between about 9.1 and 9.7 or between about 8.3 and 8.9.

2. The composition according to claim 1 wherein said organic polyisocyanate is selected from the group consisting of aliphatic, cycloliphatic, and aromatic polyisocyanates.

3. The composition according to claim 2 wherein said organic polyisocyanate is polymethylene polyphenylisocyanate or methylenediisocyanate.

4. The composition according to claim 1 wherein said organic polyisocyanate is a polyisocyanate prepolymer prepared by reacting an excess of a polyisocyanate compound and polyol.

5. The composition according to claim 1 wherein said polyol is selected from the group consisting of castor oil, polyether polyols, hydroxyl-bearing hompolymers of dienes, hydroxyl-bearing copolymers of dienes, and mixtures thereof.

6. The composition according to claim 5 wherein said polyol is a hydroxyl terminated polybutadiene.

7. The composition according to claim 1 wherein the liquid cyclic olefin is polycyclopentadiene, dicyclopentadiene, pinene, or dipentene.

8. The composition according to claim 1 wherein said plasticizer is tridecyl adipate, diundecyl phthalate, soybean oil, diisodecyl phthalate, glyceryl tri (acetyl ricinoleate), or dibutyl phthalate.

9. A grease compatible polyurethane composition comprising about 50 to 90 parts of the liquid reaction product of an organic polyisocyanate and a polyol in the presence of a liquid cyclic olefin, the polyisocyanate polyol reaction product being present in a range of from 8 to 99 parts by weight and said cyclic olefin being present in a range from 92 to 1 part by weight, and from about 50 to 10 parts of a plasticizer compound having a total solubility parameter of between about 8.3 and 8.9 or between about 9.1 and 9.7.

10. A grease compatible cyclic olefin extended polyurethane gel composition comprising from about 10 to 50 parts of the liquid reaction product of an organic polyisocyanate with a polyol in the presence of a liquid cyclic olefin, the polyisocyanate polyol reaction product being present in a range of from about 8 to 99 parts by weight and said cyclic olefin being present in a range from about 92 to 1 part by weight, and from about 90 to 50 parts by weight of a plasticizer having a total solubility parameter of between about 9.1 and 9.7 or between about 8.3 and 8.9.

11. The gel composition of claim 10 wherein the liquid reaction product is present in the range of from about 30 to 40 parts by weight and the plasticizer compound is present in a range of about 70 to 60 parts by weight.

12. A process for providing a fluid impervious protective seal around an insulated electrical device which comprises introducing the components of the composition of claim 1 into a confined space surrounding the section of a device to be protected and allowing said composition to cure to a gel.

13. A process for providing a fluid impervious protective seal around an insulated electrical device which comprises introducing the components of the composition of claim 9 into a confined space surrounding the section of a device to be protected and allowing said composition to cure to a gel.

14. A process for providing a fluid impervious protective seal around an insulated electrical device which comprises introducing the components of the composition of claim 10 into a confined space surrounding the section of a device to be protected and allowing said composition to cure to a gel.

15. A process for providing a fluid impervious protective seal around an insulated electrical device which comprises introducing the components of the composition of claim 11 into a confined space surrounding the section of a device to be protected and allowing said composition to cure to a gel.

16. The process of claim 12 wherein said composition is used to encapsulate said device.

17. The process of claim 12 wherein said composition is used to reclaim said device.

18. The process of claim 16 wherein said composition contains 30 to 40 parts by weight of liquid reaction product and 70 to 60 parts by weight of plasticizer compound.

19. The process of claim 17 wherein said composition contains 30 to 40 parts by weight of liquid reaction product and 70 to 60 parts by weight of plasticizer compound.

20. An insulated electrical device comprising a plurality of insulated wire conductors and the cured polyurethane gel of claim 1.

21. An insulated electrical device comprising a plurality of insulated wire conductors and the cured polyurethane gel of claim 9.

22. An insulated electrical device comprising a plurality of insulated wire conductors and the cured polyurethane gel of claim 10.

23. An insulated electrical device comprising a plurality of insulated wire conductors and the cured polyurethane gel of claim 11.

24. A grease compatible polyurethane composition comprising about 50 to 90 parts the liquid reaction product of an organic polyiscyanate and a polyol in the presence of about 50 to 10 parts of a plasticzer compound having a total solubility parameter of between about 8.3 and 8.9 or between about 9.1 and 9.7.

25. The composition according to claim 24 wherein said plasticizer is tridecyl adipate, diundecyl phthalate, soybean oil, diisodecyl phthalate, glyceryl tri (acetyl ricinoleate), or dibutyl phthalate.

* * * * *